May 26, 1953     H. L. HARTZELL     2,639,496

METHOD OF MAKING SHOCK ABSORBING CONNECTIONS

Original Filed March 14, 1945

INVENTOR
HERMAN L. HARTZELL

BY Spencer, Hardman & Fehr

HIS ATTORNEYS

Patented May 26, 1953

2,639,496

UNITED STATES PATENT OFFICE 2,639,496

METHOD OF MAKING SHOCK ABSORBING CONNECTIONS

Herman L. Hartzell, Anderson, Ind., assignor to General Motors Corporation, Detroit, Mich., a corporation of Delaware Original application March 14, 1945, Serial No. 582,761. Divided and this application February 17, 1949, Serial No. 77,001

1 Claim. (Cl. 29—148)

This invention relates to a drive shaft coupling having provisions for minimizing shocks or vibration before they are transmitted from the drive shaft to the driven shaft and is a division of my copending application Serial No. 582,761, filed March 14, 1945, now Patent No. 2,560,644.

This invention is particularly adapted for use with an ignition distributor and unit which is interchangeable with a magneto. In such construction it is the common practice to provide the timer distributor unit with a horizontal shaft in substitution for the usual horizontal shaft of the magneto and this horizontal shaft drives the vertical shaft of the timer distributor. In this connection it is an object of the present invention to provide a flexible coupled drive shaft having overall dimension so that it will be interchangeable with other shafts now in use.

Another object of the present invention is to provide a two-piece torsional shock absorbing drive shaft with rubber not molded in place. To accomplish this object a pair of concentric members are provided and a rubber boot. The boot is fitted over the end of the inner member and stretched by an assembler from its normal condition to a cross dimension so that same will fit snugly within the outer member. Upon release of the boot it will tend to return to its normal condition filling the space between the two concentric members.

Another object of the present invention is to provide a drive shaft assembly whereby two concentric members may be operatively connected one with the other for unitary rotation but wherein yieldable means are provided to allow slight rotation of one of the members relative to the other member to absorb the torsional impacts imparted to either member.

Another object of the invention is to facilitate the assembly of the horizontal and vertical shafts with a housing whereby these two shafts together with their bearings and the gears associated with the respective shafts may be assembled as sub-assemblies with the housing.

Further objects and advantages of the present invention will be apparent from the following description, reference being had to the accompanying drawings wherein a preferred embodiment of the present invention is clearly shown.

Figure 1:
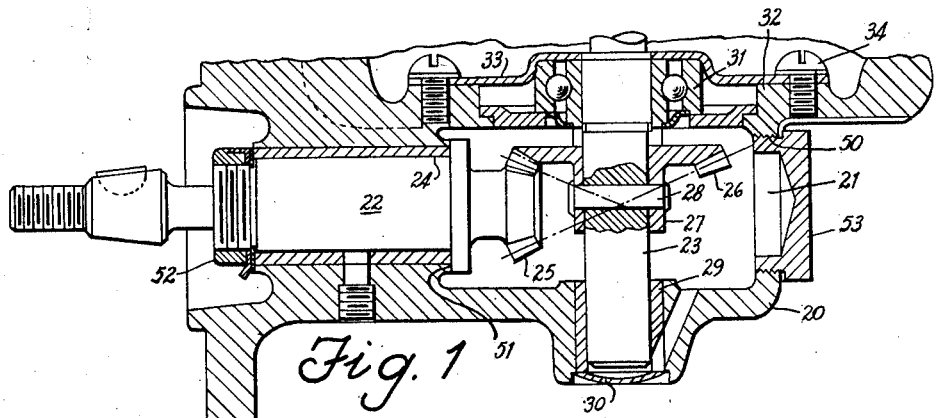
Fig. 1 is a fragmentary sectional view of a housing showing the drive shaft assembly embodying the present invention.
Figure 3:
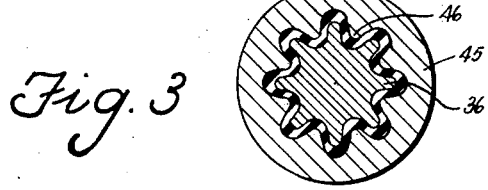
Fig. 3 is a sectional view taken on line 3—3 of Fig. 2.
Figure 2:
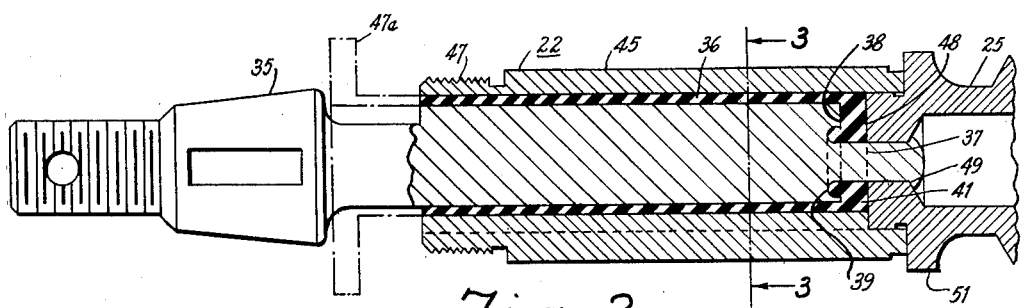
Fig. 2 is a sectional view on an enlarged scale of the drive shaft.
Figure 4:
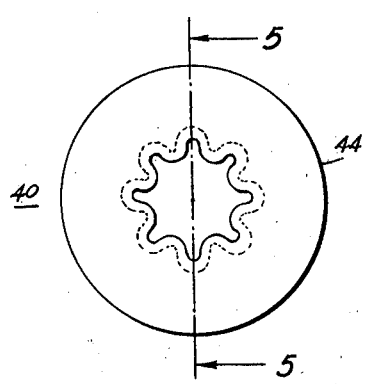
Fig. 4 is a plan end view of the rubber boot or sleeve.

Referring to Fig. 1 a housing 20 is provided with a chamber 21 for the reception of shafts 22 and 23 respectively and the bearings and gears associated therewith. The shaft 22 is journalled in a plain bearing 24 supported by the housing 20 at one side of the chamber 21. The shaft 22 drives a bevel gear 25 which meshes with a bevel gear 26 having a hub 27 attached to the shaft 23 by a pin 28. The end of the shaft 23 is journalled in a plain bearing 29 at the bottom of the chamber and closed by a plug 30. The shaft 23 is supported by a ball bearing 31 retained upon a wall 32 of the housing 20 by a retainer ring 33 secured to the wall by screws 34.

Figure 5:
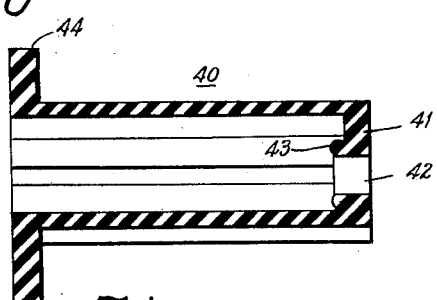
Fig. 5 is a sectional view taken on line 5—5 of Fig. 4.

As is more clearly shown in Figs. 2 to 5, inclusive, the drive shaft 22 comprises a metallic drive shaft 35 having a series of radial ribs 36 and having a reduced portion 37 to provide a shoulder or abutment 38. The shoulder has an annular groove 39. The fluted portion is adapted to be enclosed by a soft rubber corrugated boot or sleeve 40 having a closed end 41 provided with an aperture 42 through which the extension 37 projects. The inner surface of the closed end 41 has an annular bead 43 adapted to fit into the annular groove 39. The longitudinal dimension of the sleeve corresponds to the contour of the corrugated portion of the shaft 35. The sleeve 40 as shown in Fig. 5 is provided by a lateral flange 44 but which is later severed from the sleeve after same is assembled in a metallic sleeve 45.

The shaft 35 with the rubber sleeve therearound is adapted to be inserted within the metallic sleeve 45 having a series of inwardly extending ribs 46 corresponding to the outer surface of the rubber boot. The sleeve 45 has attached thereto the pinion or gear 25 by brazing. The other end of the sleeve 45 is provided with a threaded portion 47. Before the shaft 35 and boot 40 assembly is inserted into the sleeve 45 the rubber boot is first stretched. The normal cross dimensions of the rubber boot is greater than the inner cross dimensions of the metallic sleeve, thus the boot is stretched longitudinally. This is accomplished by getting ahold of the flange 47 and elongating same to the position indicated by the dot and dash lines 47a in Fig. 5. This stretching reduces the cross dimensions of the rubber boot to permit the shaft and boot to be slid into the sleeve 45 with the extension passing through an aperture provided by the gear 25, until the wall 41 engages the end 48 of the gear within the sleeve 45. When that occurs the flange 47a is released allowing the rubber boot 40 to approach its normal condition, the diameter increasing until it is firmly compressed between the shaft 35 and the sleeve 45. After the assembler has released the flange he will rivet over the end 37 against a shoulder 49 to compress the bottom wall 41 of the boot. The flange 47a is then cut off at the threaded end of the sleeve.

The whole assembly forming the shaft 21 and gear 25 is assembled within the housing 20 by inserting same through a threaded aperture 50 in the housing 20. A flange 51 provided by the gear 25 engages a shoulder 51a provided by the housing after which the shaft assembly 22 is secured in place by a nut 52. The aperture 50 is closed by a threaded cap 53.

While the embodiment of the present invention as herein disclosed, constitutes a preferred form, it is to be understood that other forms might be adopted.

What is claimed is as follows:

A method of making a shock absorbing connection between a splined shaft including a longitudinal extension at one end thereof of reduced diameter to provide a shoulder and a splined sleeve having a closed end provided with an opening of slightly larger diameter than the extension of the shaft, the sleeve having a greater internal diameter than the outer diameter of the shaft to provide a space therebetween when the two parts are in assembled position comprising the steps which include, forming a flanged cup-shaped rubber like boot having an apertured end wall with a bead extending around the aperture and wherein the wall thickness of the boot is greater than the space between the shaft and sleeve and is formed to fit over the shaft in close association thereto, assembling the boot to the shaft so that the apertured end seals against the end of the shaft and around the longitudinal extension, stretching the boot longitudinally on the shaft by pressure exerted against the flange portion only thereof for reducing the thickness of the boot to a dimension less than the space between the shaft and the sleeve; inserting the shaft with the stretched boot thereon within the sleeve so that the reduced extension of the shaft extends through the aperture in the closed end of the sleeve; releasing the flange to permit the rubber boot to expand to fill resiliently and completely the space between the shaft and the sleeve whereby a shock absorbing layer of resilient material is present between the shaft and the sleeve and between the shoulder and the closed end of the sleeve; riveting the extension of the shaft loosely over the sleeve after assembly thereof for further compressing the boot and for compressing the bead thereby preventing displacement of the shaft from the sleeve while permitting slight relative angular and longitudinal movement between the shaft and the sleeve for shock absorbing purposes; and finally removing the flange.

HERMAN L. HARTZELL.

References Cited in the file of this patent

UNITED STATES PATENTS

| Number | Name | Date |
|---|---|---|
| 1,979,969 | Geyer | Nov. 6, 1934 |
| 2,110,783 | Welker | Mar. 8, 1938 |
| 2,129,257 | Bachman | Sept. 6, 1938 |
| 2,199,926 | Swennes | May 7, 1940 |
| 2,259,460 | Dexter | Oct. 21, 1941 |
| 2,252,299 | McCoy | Aug. 12, 1941 |
| 2,270,309 | Kehle | Jan. 20, 1942 |
| 2,435,602 | Rickmeyer | Feb. 10, 1948 |